United States Patent Office 2,773,855
Patented Dec. 11, 1956

2,773,855
COMPOSITIONS FOR DECORATIVE PURPOSES

Jerome Hochberg, Newburgh, and Silvio A. Pellerano, Brooklyn, N. Y., assignors to Allied Chemical & Dye Corporation, New York, N. Y., a corporation of New York No Drawing. Application October 7, 1952,
Serial No. 313,614

6 Claims. (Cl. 260—33.8)

This invention relates to new compositions which may be used for decorative purposes. More particularly, the invention is directed to liquid compositions which may be sprayed or dispersed in aerosol condition to produce an artificial snow material which is adapted for use to form frosted or snow-like decorations for example on Christmas trees, evergreen foliage, wreaths, packages, windows, etc., or to produce snowstorm effects.

A principal object of the invention lies in the provision of compositions which may be used to create formation of material closely simulating new-fallen snow and which compositions are non-flammable while in liquid state prior to use, during the aerosol stage at the time the active ingredients are being sprayed or dispersed and deposited on the object to be decorated, and after the snow-like material has been deposited on the object sought to be ornamented. The invention further provides compositions of the nature described which are non-toxic non-irritating and substantially non-odorous, and which, after spraying or dispersion, cause production of decorative flocculates, deposits or granules which are snow-like white in color, will not spot polished surfaces such as furniture, are permanent i. e. non-volatile, are sufficiently adherent to form an incrustation on a tree branch or other object, but on the other hand are non-sticky and non-dusty and may be easily removed from various surfaces such as windows and furniture by means of e. g. a water damp cloth.

The compositions of the invention, in general, are liquid compositions comprising a propellant agent, and an active component which is adapted to be sprayed or dispersed in aerosol form and, almost instantaneously thereafter, produce an artificial snow. In accordance with the invention, it has been found that the objects thereof may be accomplished by incorporating in a suitable propellant one or more of certain methacrylate polymers and one or more of certain aliphatic substituted phenolic oil soluble resins. It will be understood that a propellant agent is a non-flammable, non-toxic substantially non-odorous material which is gaseous under conditions of normal temperature and pressure, but which prior to use as an aerosol dispersing agent is held under sufficient pressure to maintain the propellant in the liquid phase. The mechanics of formation of aerosols and aerosol-like sprays are well known in the art and are disclosed in Goodhue U. S. P. 2,321,023 of June 8, 1943.

The polymer constituents of the active component of the invention compositions are butyl methacrylate polymers including the polymers of various individual butyl esters of methacrylic acid and copolymers of different butyl esters of methacrylic acid. Accordingly, in the appended claims the designation "butyl methacrylate polymer" unless otherwise modified is intended to denote and include such polymers and copolymers. Polymers which are preferred (the term polymer being used to include copolymer unless otherwise indicated) are polymers and copolymers of methacrylic esters of primary butyl alcohols. Examples of these are normal butyl methacrylate polymer, isobutyl methacrylate polymer, and normal butyl-isobutyl methacrylate copolymer. Materials of this nature are readily obtainable in the open market as solids which substantially consist of normal butyl methacrylate homopolymer, isobutyl methacrylate homopolymer, and a copolymer consisting of normal butyl and isobutyl methacrylate polymers e. g. in substantially equal parts by weight. These materials are further characterized by ready solubility, up to 50% and more at room temperature, in certain known propellant materials.

The resin constituents of the active component of the compositions of the invention are those aliphatic-substituted phenolic oil soluble resins which are soluble to at least some appreciable extent in a hereinafter defined solvent and which, in the better forms of the invention, are at least about 5% soluble in such solvent. In this specification and appended claims, e. g. "5% soluble" is intended to mean that at least 5 parts by weight of a material A are substantially completely soluble at room temperature in 95 parts by weight of a solvent material B, the combined weights of solvent and solute equalling 100 parts. Unless otherwise indicated, solubilities mentioned herein are with reference to room temperature.

In the best embodiments of the invention, the preferred liquefied gaseous propellant utilized is a specific product which has a vapor pressure of about 38–39 p. s. i. g. at 70° F., contains by weight about 76% 1,1,1-difluorochloroethane, about 16% dichlorodifluoromethane, and about 8% trichlorofluoromethane. This material has a total volatile matter content (trichlorofluoromethane not being volatile matter in the aerosol sense) of 1,1,1-difluorochloroethane and dichlorodifluoromethane of about 92% by weight, and has a specific gravity of about 1.16 at 70° C. This propellant is fully described in and constitutes part of the subject matter of Lodes U. S. P. 2,529,092 of November 7, 1950.

As hereinafter indicated and exemplified, while the specific propellant above described is the preferred propellant utilized in practice of the best aspects of the invention, the latter is not restricted to the use of such propellant. However, regardless of whatever suitable propellant may be employed in carrying out the invention, it has been found that the solvent properties and other characteristics of the specific propellant material described may be utilized as a principal gauge or yardstick for determination of the suitability of an aliphatic-substituted phenolic oil soluble resin for utilization as the resin constituent of the active component of the compositions of the invention. Hence, it will be understood that, in the practice of the invention, the above-described specific material disclosed in the Lodes patent serves a twofold function: first, as the preferred propellant in the best forms of the invention; and second, the solvent properties of such material of the Lodes patent serve as an indicator of the suitability for use in the invention of the aliphatic-substituted phenolic oil soluble resins, it being understood that these two functions have no interdependent relation. In view of the wordiness of a complete and accurate definition of the particular propellant-solvent material mentioned above and disclosed in the Lodes patent, for convenience and brevity in this specification and in appended claims, such material, containing by weight about 76% 1,1,1-difluorochloroethane, about 16% dichlorodifluoromethane, and about 8% trichlorofluoromethane, is referred to as "DF–DC–TC," or as "liquid 76% CH$_3$CClF$_2$—16% CCl$_2$F$_2$—8% CCl$_3$F.

The polymers and copolymers referred to herein are markedly soluble in liquid DF–DC–TC, and such solubilities may vary from about 30% up to about 50% and more. These polymers and copolymers are also soluble in varying degrees in other chlorofluorocarbon propellant materials: for example, to the extent of at least about 50% in $CCl_3F$, and such polymers and copolymers for purposes of the present invention are adequately soluble in materials such as $CH_3CClF_2$ and $CHClF_2$. In practice, the methacrylates described may be used singly or in mixtures of themselves in any proportions. However, experience indicates that, with respect to most desirable characteristics of the final snow-like products, the preferred material is a normal butyl-isobutyl methacrylate copolymer containing about equal parts by weight of normal butyl and isobutyl constituents. Particular suitability of this copolymer may also be related to its high solubility (room temperature) in the propellants herein described, e. g. about 50% in the preferred DF–DC–TC. For practical purposes, solubilities of isobutyl methacrylate polymer, and of normal butyl methacrylate polymer in the propellants and propellant mixture described herein are about the same.

Each of the resins employed as an ingredient of the active component of the compositions is an initially solid aliphatic-substituted phenolic resin which is soluble in hydrocarbon oils such as toluene, xylene, solvent naphthas, and in drying oils such as linseed and tung oils, i. e. "oil soluble" in the sense the expression is used in the resin art. The principal indicator of suitability of the resins within the class stated is their solubility in liquid DF–DC–TC, the solubility value in the latter preferably being at least about 5% at room temperature, and more desirably of the order of at least 20–25%. Examples of suitable and readily available resins are as follows: a non-heat reactive resinous condensation product of formaldehyde and mono-amyl phenol, which product is soluble in liquid DF–DC–TC to the extent of about 50% at room temperature, and which is obtainable under the trade designation of Bakelite BR–4036; a paratertiary butyl phenol-formaldehyde thermosetting resin having a solubility in liquid DF–DC–TC of about 50% at room temperature, such material being obtainable under the trade designation of Superbeckacite 1001; a heat reactive resinous condensation product of formaldehyde and mono-butyl phenol, which product is soluble in liquid DF–DC–TC to the extent of about 50% at room temperature, and which is obtainable under the trade designation of Bakelite BR–14634; and a paratertiary butyl phenol-acetylene thermoplastic resin which is soluble in liquid DF–DC–TC to the extent of about 70% at room temperature, and which is obtainable under the trade designation of Koresin. Of the foregoing exemplified materials phenol-formaldehyde resins are particularly desirable, and the material preferred for use in the better embodiments of the invention is the paratertiary butyl phenol-formaldehyde thermosetting resin.

As stated, the compositions of the invention include a propellant agent, and an active component which in itself comprises a polymer material and a resin material. The compositions may contain any effective amount of active component, say as little as 2 to 3% by weight of total polymer and resin. Maximum amount of active component is less by weight than the quantity of propellant and is somewhat dependent upon the nature, particularly the solvent properties, of the particular propellant employed. With the preferred propellants described herein, the active component constituent may be as high as 25% by weight, while on the other hand with utilization of some propellant formulations, which afford satisfactory propellants per se but have less effective solvent properties, total polymer and resin constituents may be appreciably less than 25% by weight. In desirable forms of the invention, the active component constitutes from about 5 to about 25% by weight of the composition, while the more usual compositions which are more preferable from standpoint of overall efficacy contain from about 10% to about 20% by weight of active component. On the other hand, the active component content of preferred specific embodiments of the invention lies in the range of about 13–17%.

The proportioning of the polymer material and the resin material contained in the active component may vary considerably depending to a notable degree upon the desired texture of the ultimate dispersed and permanently formed snow-like material. In texture and physical appearance, the artificial snow products resulting from use of the compositions of the invention may range from a predominantly granular condition to a flocculent deposit or incrustation in which the predominant physical characteristic is that of a multiplicity of bodies varying from small semi-spherical hollow or solid particles less than one-sixteenth of an inch in largest dimension to what appear to be hollow or solid semi-spheres in some instances having largest dimension of the order of one fourth of an inch. It appears that this permissible variation in texture, running generally from almost totally granular through gradations to almost totally semi-spherical or globular form is, to some important extent, dependent upon the ratio of resin material to polymer material in the active component. Experience indicates that as the quantity of resin material is increased with respect to a given amount of polymer material, the tendency toward formation of the more granular snow-like particles increases, and a too large portion of resin relative to polymer accentuates the granular condition to such an extent that the final snow material may have a marked tendency toward non-adherence and dustiness. On the other hand, while an active component which is made up of a very small amount of resin, relative to the polymer content, forms a deposit which in itself from standpoint of adherence and appearance is a satisfactory snow-like material, such active components containing too great a proportion of polymer form a snow material which, in its dispersion and incipient stages of solidification, in some circumstances may possess an undesirable stickiness and may have a property which has a tendency to spot polished surfaces and to prevent ready removability from surfaces as by wiping with a water damp cloth. Good snow-like deposits may be obtained in instances where, in the active component, resin material and polymer material are present in the weight ratio range (resin:polymer) of 4:1 to 2:3. That is, in situations where, as preferred, the active component contains no significant amount of ingredient other than resin and polymer, the resin content of the active component by weight may vary from about 80% to about 40%, and the content of the polymer material may vary from about 20% to about 60%. In the more desirable embodiments, the active component contains at least as much resin as polymer, preferably more resin than polymer, but the weight ratio of resin to polymer does not exceed 4:1. Thus, where the active component contains only resin and polymer, such component may contain from about equal parts of resin and polymer to a major amount of resin but not in excess of about 80% by weight. In the best forms of the invention, the resin to polymer weight ratio in the active component is approximately 3:2. With respect to liquid compositions as a whole, at least 2% by weight of polymer material and at least 3% by weight of resin material are preferred; and liquid compositions containing about 4–6% by weight of a normal butyl-isobutyl methacrylate copolymer, and about 9–11% by weight of a paratertiary butyl phenol-formaldehyde oil soluble thermosetting resin about 50% soluble at room temperature in a liquid mixture containing by weight 76% $CH_3CClF_2$—16% $CCl_2F_2$—8% $CCl_3F$ are particularly desirable.

Broadly, the particular propellant formulations utilized in practice of the invention are not of major critical importance. Propellant agents may include as constituents one or more of any of the known chlorofluoromethanes or ethanes (referred to herein as chlorofluorocarbons) which are gaseous under conditions of normal temperature and pressure and which are suitable for the specific purposes at hand, regard being given to the specific manner in which it is desired to effect aerosol dispersion of the active component, that is, by means of a high or low pressure "bomb." Hence, there may be employed high or low pressure propellant agents, which may include $CH_3CClF_2$, $CCl_2F_2$, $CCl_3F$, and $CHClF_2$, it being understood that $CCl_3F$ is not a dispersant in the aerosol sense but functions predominantly as a non-deleterious pressure reducing medium. Current Governmental regulations require that propellant agents used in low pressure "beer can" type of aerosol bombs have a vapor pressure of about 40 or less p. s. i. g. at about 70° F. Accordingly, if the active components of the invention are to be utilized in connection with the convenient low pressure dispensers, the propellant composition may be any suitable formulation of the indicated or other chlorofluorocarbons which has a maximum vapor pressure in the liquid state of say 38–39 p. s. i. g. or less at about 70° F. Practice indicates that an approximately 50-50 by weight mixture of $CCl_2F_2$ and $CCl_3F$ may be employed as the low pressure dispersant. Propellant mixtures containing varying proportions of $CCl_2F_2$, $CCl_3F$ and $CHClF_2$, e. g. by weight about 10% $CHClF_2$, about 55% $CCl_3F$ and about 35% $CCl_2F_2$, may be utilized. However, propellant mixtures per se containing more than about 50% by weight of $CCl_2F_2$ are not preferred. Moreover, the development work on which the invention is based indicates that the best overall results with respect to dispersion of the active component and the physical characteristics of the flocculated or deposited artificial snow are obtained when the specific about 76% 1,1,1-difluorochloroethane, about 16% dichlorodifluoromethane and about 8% trichlorofluoromethane propellant hereinbefore discussed and disclosed in the Lodes patent is employed. This propellant has a vapor pressure of about 38–39 p. s. i. g. at 70° F., which lies within current specifications for low pressure dispersants, and most importantly contains about 92% by weight total of 1,1,1-difluorochloroethane and dichlorodifluoromethane both of which function as volatile matter. Moreover, another outstanding characteristic of the particular mixture of chlorofluorocarbons mentioned is the high solvent properties thereof which facilitate formation of sales units, e. g. as low pressure aerosol bomb, each of which may have a high active component content affording the advantage of high snow coverage per unit.

The formulations of the invention may be made up in any suitable way. For example, the polymer and resin may be placed in an empty container suitably designed to hold the propellant under sufficient pressure to maintain the same in the liquid condition. The propellant may be added to the container from a supply reservoir, and the container then shaken or the contents otherwise mechanically agitated for a period of say 10 minutes to half an hour depending upon the size of the charge. The polymer and resin materials go into what appear to be a true solution in the propellant. The foregoing mixing may be effected at room temperature or below if desired.

The following are examples of practice of the invention, parts being parts by weight:

*Example 1.*—17 parts of a copolymer consisting of normal butyl and isobutyl methacrylate polymers in substantially equal parts by weight, and 34 parts of the previously described paratertiary butyl phenolformaldehyde oil soluble thermosetting resin (Superbeckacite 1001) having a solubility in liquid DF–DC–TC of about 50% at room temperature were dissolved by shaking at room temperature in 289 parts of the liquid DF–DC–TC solvent-propellant described herein, all ingredients being under a vapor pressure of about 38–39 p. s. i. g. at 70° F. in a beer can type aerosol bomb. Such formulation had the following composition:

| | Percent |
|---|---|
| Polymer material | 5.0 |
| Resin material | 10.0 |
| Liquid DF–DC–TC | 85.0 |

On release of the bomb valve, a liquid stream was obtained which when directed on objects to be decorated produced a brilliant white snow-like incrustation of which the predominant physical characteristics were a multiplicity of bodies varying from small semi-spherical hollow or solid particles less than one-sixteenth of an inch in largest dimension to what appeared to be hollow or semi-spheres in some instances having largest dimension of the order of one fourth of an inch.

*Example 2.*—The operation of Example 1 was repeated, but varied to the extent of using in place of liquid DF–DC–TC, a mixture of about equal parts by weight of $CCl_2F_2$ and $CCl_3F$ in which instance the materials in the low pressure bomb were under a vapor pressure of about 37 p. s. i. g. at 70° F. On release of the valve, a liquid stream was obtained which formed incrustations of about substantially the same physical characteristics as in Example 1.

*Example 3.*—17 parts of a copolymer consisting of normal butyl and isobutyl methacrylate polymers in substantially equal parts by weight, and 17 parts of the previously described paratertiary butyl phenol-acetylene oil soluble thermoplastic resin (Koresin) having a solubility in liquid DF–DC–TC to the extent of about 70% were dissolved in 306 parts of the hereindescribed liquid DF–DC–TC solvent-propellant in the same manner as described in Example 1. This formulation had the following composition:

| | Percent |
|---|---|
| Polymer material | 5.0 |
| Resin material | 5.0 |
| DF–DC–TC propellant | 90. |

Upon release of the bomb valve, a liquid stream was obtained which when directed on Christmas tree branches produced a snow-like incrustation of physical characteristics similar to the snow of Example 1.

We claim:

1. A liquid composition containing an active component adapted to be dispersed in aerosol form and a propellant agent; said active component constituting from about 5% to about 25% by weight of said composition and comprising a normal butyl-isobutyl methacrylate copolymer in amount at least 2% by weight of said composition, and a paratertiary butyl phenol-formaldehyde oil soluble thermosetting resin about 50% soluble at about room temperature in a liquid mixture containing by weight 76% $CH_3CClF_2$—16% $CCl_2F_2$—8% $CCl_3F$, said resin being present in amount at least 3% by weight of said composition; said active component being incorporated in said propellant agent, which is a normally gaseous chlorofluorocarbon containing not more than two carbon atoms, held under sufficient pressure to maintain the same in the liquid phase.

2. A liquid composition containing an active component adapted to be dispersed in aerosol form and a propellant agent; said active component constituting from about 10% to about 20% by weight of said composition and comprising a minor quantity of a normal butylisobutyl methacrylate copolymer in amount at least 2% by weight of said composition, and a major quantity of a paratertiary butyl phenol-formaldehyde oil soluble thermosetting rein about 50% soluble at about room temperature in a liquid mixture containing by weight 76% $CH_3CClF_2$—16% $CCl_2F_2$—8% $CCl_3F$, said resin being present in amount at least 3% by weight of said composition; said active component being incorporated in said propellant agent, which is a normally gaseous propellant material consisting of 76% $CH_3CClF_2$—16% $CCl_2F_2$—8% $CCl_3F$ by weight, held under sufficient pressure to maintain the same in the liquid phase.

3. A liquid composition containing an active component adapted to be dispersed in aerosol form and a propellant agent; said active component constituting about 15% by weight of said composition and comprising a minor quantity of a normal butyl-isobutyl methacrylate copolymer in amount at least 2% by weight of said composition, and a major quantity of a paratertiary butyl phenol-formaldehyde oil soluble thermosetting resin about 50% soluble at about room temperature in a liquid mixture containing by weight 76% $CH_3CClF_2$—16% $CCl_2F_2$—8% $CCl_3F$; said active component being incorporated in said propellant agent, which is a normally gaseous chlorofluorocarbon containing not more than two carbon atoms, held under sufficient pressure to maintain the same in the liquid phase.

4. A liquid composition consisting of about 4–6% by weight of a normal butyl-isobutyl methacrylate copolymer, about 9–11% by weight of a paratertiary butyl phenol-formaldehyde oil soluble thermosetting resin about 50% soluble at room temperature in a liquid mixture containing by weight 76% $CH_3CClF_2$—16% $CCl_2F_2$—8% $CCl_3F$, said copolymer and resin being incorporated in a normally gaseous propellant agent consisting of 76% $CH_3CClF_2$—16% $CCl_2F_2$—8% $CCl_3F$ by weight and constituting the balance by weight of said composition.

5. A liquid composition consisting of about 5% by weight of a normal butyl-isobutyl methacrylate copolymer, about 10% by weight of a paratertiary butyl phenol-formaldehyde oil soluble thermosetting resin about 50% soluble at room temperature in a liquid mixture containing by weight 76% $CH_3CClF_2$—16% $CCl_2F_2$—8% $CCl_3F$, said copolymer and resin being incorporated in a normally gaseous propellant agent consisting of 76% $CH_3CClF_2$—16% $CCl_2F_2$—8% $CCl_3F$ by weight and constituting about 85% by weight of said composition.

6. A liquid composition containing an active component adapted to be dispersed in aerosol form and a propellant agent; said active component constituting from about 5 to 25% by weight of said composition and comprising a butyl methacrylate polymer in amount at least 2% by weight of said composition, and an aliphatic-substituted phenolic oil soluble resin of the group consisting of a non-heat reactive resinous condensation product of formaldehyde and mono-amyl phenol, a heat reactive resinous condensation product of formaldehyde and mono-butyl phenol, and a paratertiary butyl phenol-acetylene thermoplastic resin; said resin being at least about 50% soluble at about room temperature in a liquid mixture containing by weight 76% $CH_3CClF_2$—16% $CCl_2F_2$—8% $CCl_3F$, and said resin being present in amount at least 3% by weight of said composition; said active component being incorporated in said propellant agent, which is normally a gaseous chlorofluorocarbon containing not more than about two carbon atoms, held under sufficient pressure to maintain the same in liquid phase.

References Cited in the file of this patent

FOREIGN PATENTS 583,796     Great Britain    ---------- Dec. 31, 1946